Figure 1:
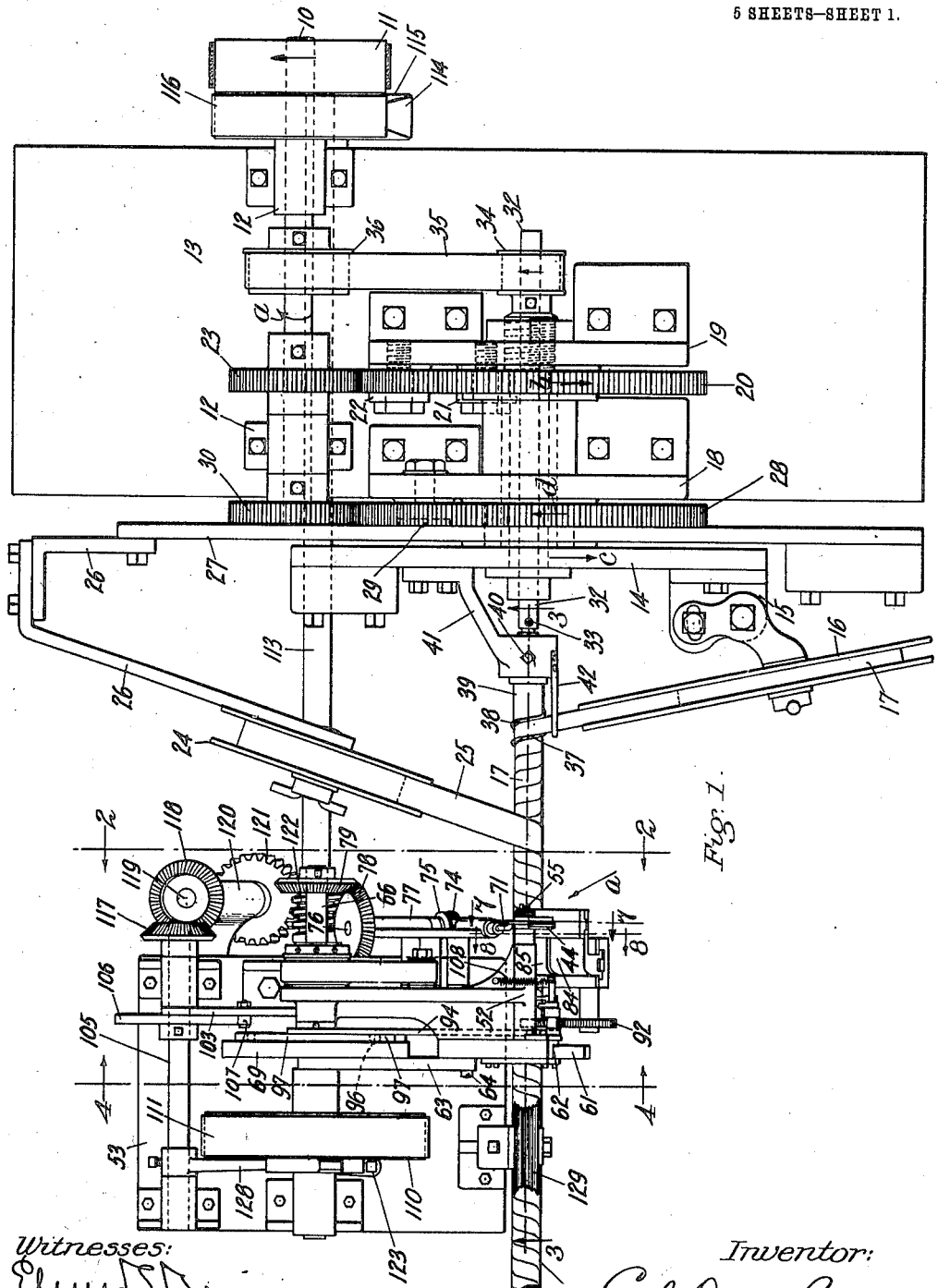

C. O. BERG.
MACHINE FOR MANUFACTURING FLEXIBLE ELECTRIC CONDUITS.
APPLICATION FILED AUG. 16, 1911.

1,067,161.

Patented July 8, 1913.
5 SHEETS—SHEET 1.

Witnesses:
Inventor:
Carl Oscar Berg
by Chas. F. Perkins Attorney

C. O. BERG.
MACHINE FOR MANUFACTURING FLEXIBLE ELECTRIC CONDUITS.
APPLICATION FILED AUG. 16, 1911.
1,067,161.
Patented July 8, 1913.
5 SHEETS—SHEET 2.
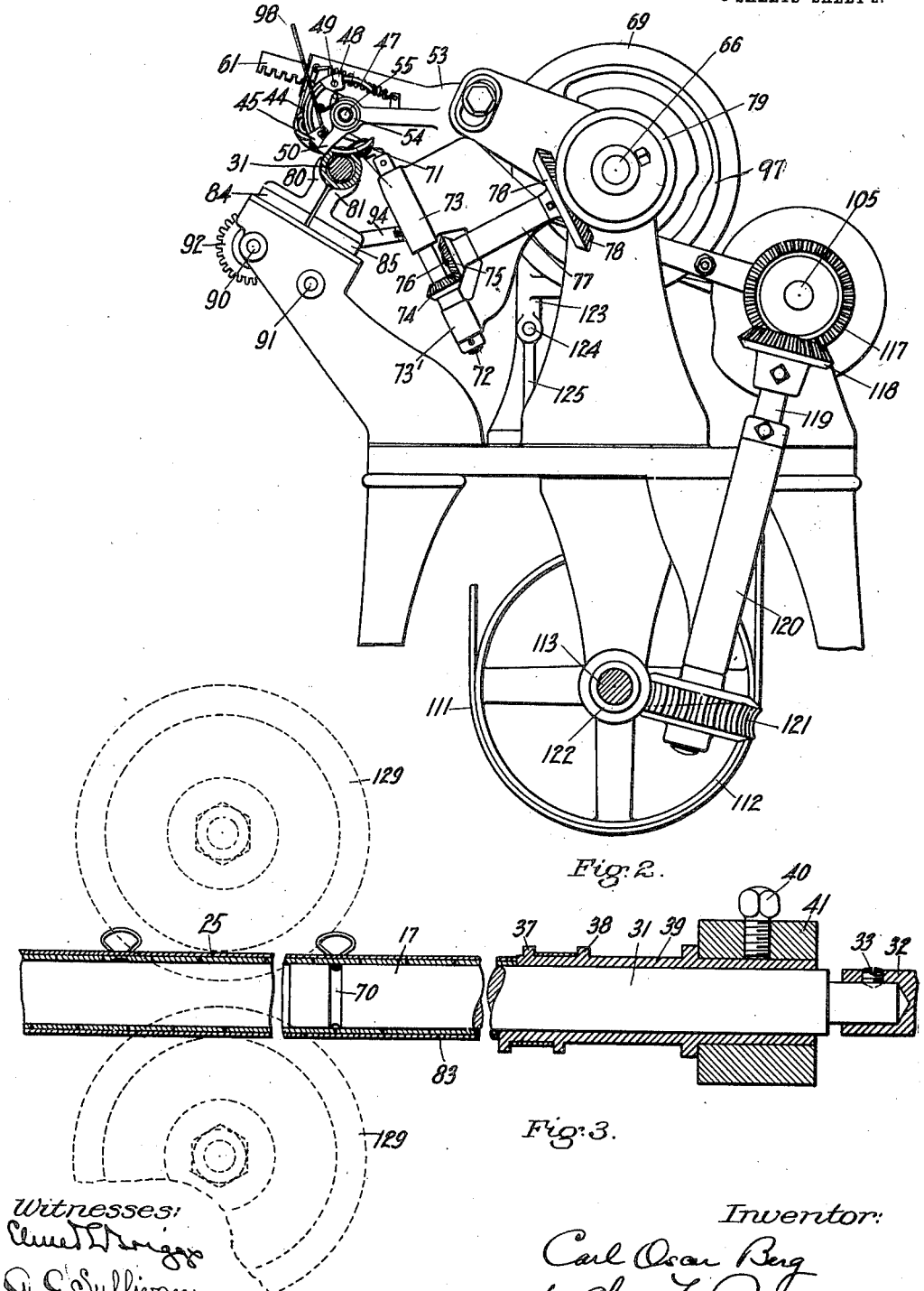

C. O. BERG.
MACHINE FOR MANUFACTURING FLEXIBLE ELECTRIC CONDUITS.
APPLICATION FILED AUG. 16, 1911.
1,067,161.
Patented July 8, 1913.
5 SHEETS—SHEET 3.
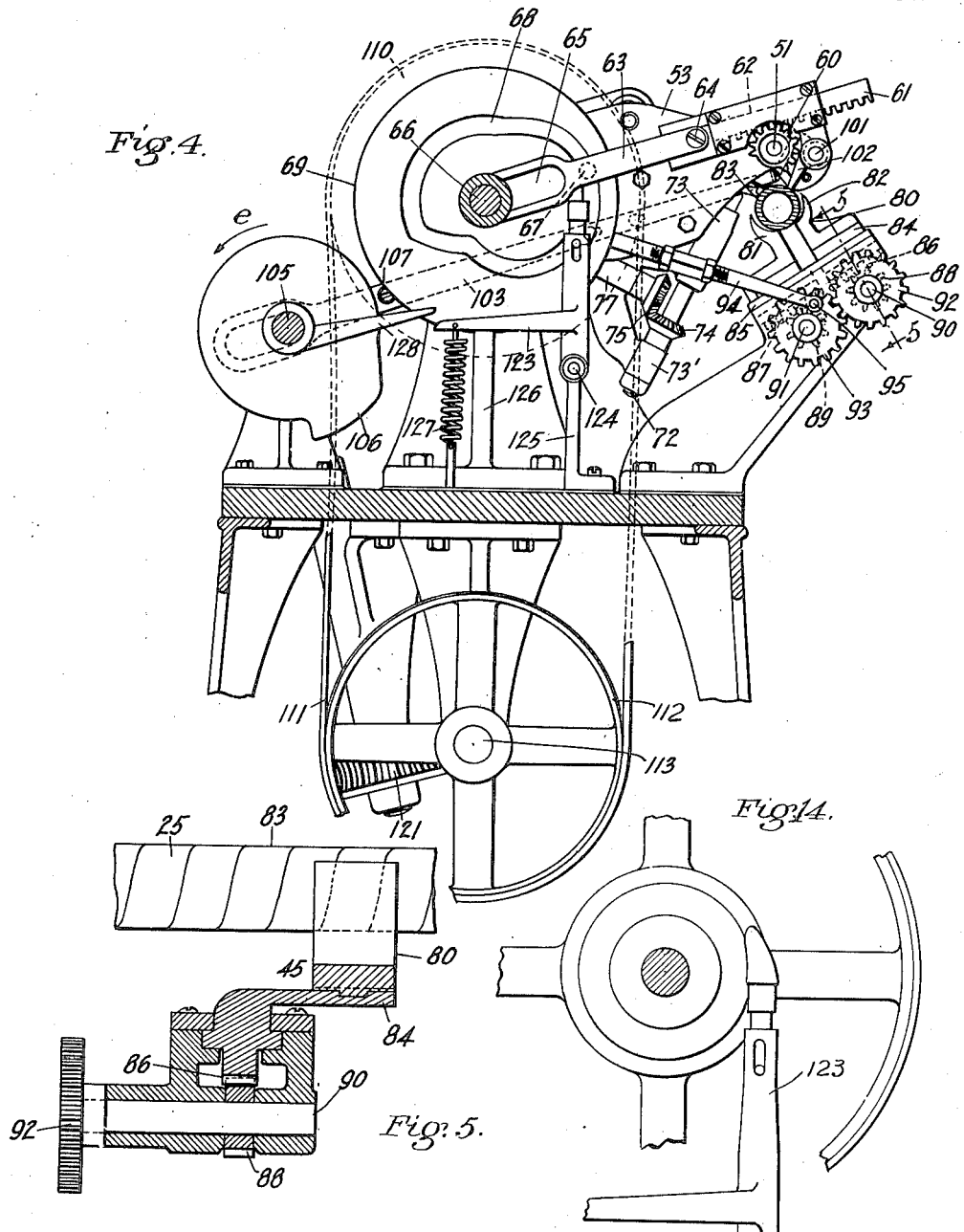

C. O. BERG.
MACHINE FOR MANUFACTURING FLEXIBLE ELECTRIC CONDUITS.
APPLICATION FILED AUG. 16, 1911.

1,067,161.

Patented July 8, 1913.

5 SHEETS—SHEET 4.

Witnesses:

Inventor:
Carl Oscar Berg
by Chas. F. Perkins Atty.

UNITED STATES PATENT OFFICE.

CARL OSCAR BERG, OF CHELSEA, MASSACHUSETTS.

MACHINE FOR MANUFACTURING FLEXIBLE ELECTRIC CONDUITS.

1,067,161.

Specification of Letters Patent.

Patented July 8, 1913.

Application filed August 16, 1911. Serial No. 644,475.

*To all whom it may concern:*

Be it known that I, CARL OSCAR BERG, a citizen of the United States, residing at Chelsea, in the county of Suffolk and State of Massachusetts, have invented new and useful Improvements in Machines for Manufacturing Flexible Electric Conduits, of which the following is a specification.

This invention relates to machines for manufacturing flexible electric conduits of the general type disclosed in the U. S. Patent to C. H. Herrick No. 456,271 dated July 21, 1891. Conduits of the general type illustrated in Fig. 3 of said Letters Patent, together with woven coverings, have been extensively manufactured and placed upon the market, these conduits consisting of a helical strip of paper fiber forming the inner lining for the conduit, and outside this helical strip of paper fiber is wound a helical strip of adhesive tape wound in the reverse direction from that of the inner lining, and outside the two helical strips is preferably woven a cover, the conduit thus formed being impregnated with waterproofing and insulating material, and finally covered with mica powder. Conduits of this class were used extensively, but a serious difficulty developed in relation to this type of conduit, for the reason that unprincipled contractors and dealers would remove the inner helical paper fiber strip by pulling longitudinally thereon, causing the inner helical tube to be reduced in diameter convolution by convolution and thus stripped from the adhesive tape and withdrawn from the cover. The object of this practice by such contractors and dealers was to increase the interior diameter of a certain size tube, thereby enabling them to buy a smaller and cheaper tube for a certain size electric conductor than they would otherwise be able to have used. The conduit, however, by this practice of removing the inside lining was rendered collapsible and very much reduced in efficiency as an electric conductor, both on account of its being collapsible and on account of its being rendered less efficient as an insulating member for the electric conductor contained therein.

For the reasons hereinbefore set forth the fire underwriters condemned the conduit and it became necessary, in order to make the conduit practicable, that the inner lining should not be removable without mutilating the conduit so as to render it useless. To overcome this difficulty the different convolutions of the inner helical tube may be joined together by flexible binding members, as, for instance, by connecting the convolutions of the helical member together by binding threads extending longitudinally of the conduit or by inserting flexible binding elements in the helical tube of the conduit and allowing the ends thereof to project, said ends being fastened to the outer cover either by adhesive waterproofing compound or by weaving or braiding the ends into the cover during the operation of weaving or braiding a cover upon the outside of the helical tube.

It is the object of this invention to provide a machine which will manufacture a flexible electric conduit and which will insert in a flexible tube flexible elements which prevent the longitudinal distortion or extension of said conduit and preferably a machine which is adapted to insert in a flexible tube a series of flexible elements which project beyond the periphery of the tube, so that when said projecting elements are connected to a cover, either by adhesive material or by weaving or braiding the same into the outer cover, the longitudinal extension and distortion of the inner tube will be prevented and thus said inner tube will be prevented from being withdrawn from its covering.

The invention consists in the combination and arrangement of parts set forth in the following specification and particularly pointed out in the claims thereof.

Figure 6:
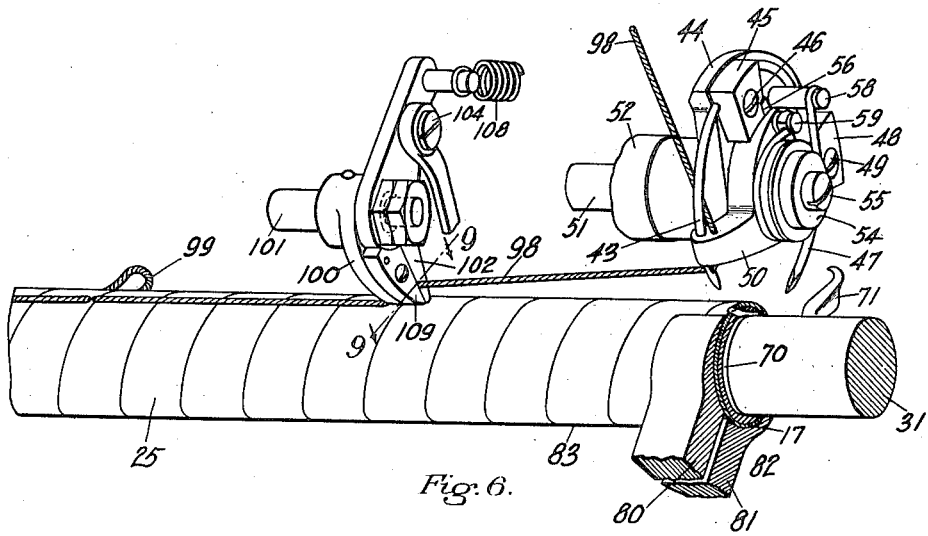
Figures 7, 8:
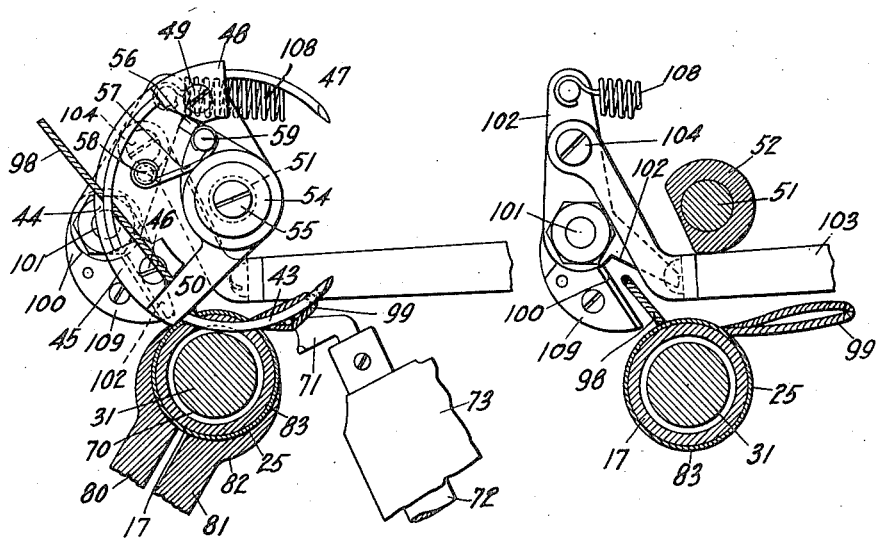
Figure 9:
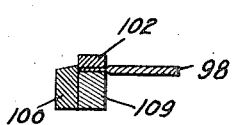

Referring to the drawings: Figure 1 is a plan view of my improved machine for manufacturing flexible tubing. Fig. 2 is a sectional elevation taken on line 2—2 of Fig. 1 looking in the direction of the arrows on said line. Fig. 3 is a detail sectional elevation taken on line 3—3 of Fig. 1, illustrating a mandrel with a helical tube and adhesive tape wound thereon. Fig. 4 is a sectional elevation taken on line 4—4 of Fig. 1, viewed in the direction of the arrows on said line. Fig. 5 is a detail sectional elevation taken on line 5—5 of Fig. 4 illustrating the clamping mechanism in connection with a portion of the mandrel and flexible tubing. Fig. 6 is a perspective view taken approximately in the direction of the arrow *a* Fig. 1 illustrating the sewing and cutting mechanisms, a portion of the clamping mechanism being also illustrated and broken away to save space in the drawings. Fig. 7 is an enlarged sectional elevation taken on line 7—7 of Fig. 1 illustrating the sewing and clamping mechanisms. Fig. 8 is a detail sectional elevation taken on line 8—8 of Fig. 1 illustrating the cutting and thread clamping mechanism. Fig. 9 is a detail section taken on line 9—9, Fig. 6. Figs. 10, 11, 12 and 13 are diagrammatic views illustrating the operation of inserting loops in the flexible tube. Fig. 14 is a conventional view of the clutch-operating mechanism.

Like numerals refer to like parts throughout the several views of the drawings.

That portion of my invention which forms the tubing is substantially the same as the machine described and illustrated in patent to J. S. Wilson No. 543,587, patented July 30, 1895, except that the bobbin carrying the adhesive tape is mounted on a different head from that upon which the bobbin carrying the paper fiber strip is mounted, and these heads rotate in opposite directions, whereas in the patent to Wilson both the alhesive tape bobbin and the fiber strip bobbin are mounted upon the same rotating head.

In the drawings, 10 is the main driving shaft which is rotated by a pulley 11 and is journaled in bearings 12, 12 fast to the frame 13. The head 14 is carried by a rotatable sleeve suitably supported, and is provided with a bracket 15 fast thereto upon which is adjustably mounted a bobbin 16 upon which is wound a strip of paper fiber 17. The head 14 is rotatably mounted upon the frame standards 18 and 19.

A rotary motion is imparted to the head 14 by a gear 20 which meshes into a gear 21 which, in turn, meshes into a gear 22, the gear 22 meshing into the gear 23 fast to the shaft 10. The shaft 10 rotates in the direction of the arrow $a$ and thus, through the two intermediate gears 22 and 21, the rotation of the gear 20 will be in the direction of the arrow $b$ which is in the same direction as the arrow $c$ indicating the direction of rotation of the head 14 which carries the fiber bobbin 16. The bobbin 24 carrying a strip of adhesive tape 25 is rotatably mounted upon a bracket 26 fast to a head 27, the head 27 being carried by a rotatable sleeve surrounding the sleeve supporting head 14 and suitably supported by the frame standard 18. The gear 28 is fastened to the head 27 and meshes into an intermediate gear 29 which, in turn, meshes into a gear 30 fast to the shaft 10. Thus it will be seen that the head 27 will be rotated in the direction of the arrow $d$, the heads 14 and 27 rotating in opposite directions.

The paper fiber 17 is wound upon a mandrel 31 (Fig. 3) said mandrel having a rotary motion imparted thereto in the direction of the arrow $d$ by a shaft 32 to which said mandrel is fastened by a set-screw 33. The shaft 32 is rotated by a pulley 34 which is connected by a belt 35 to a pulley 36 fast to the main driving shaft 10. The paper fiber strip 17, as it is being laid upon the mandrel, passes between two convolutions 37 and 38 of a helical flange formed upon the periphery of a sleeve 39 which is fastened by a set-screw 40 to a bracket 41 fastened to the head 14.

A guide finger 42 is fastened to the bracket 41 and extends forwardly therefrom, engaging one face of the paper fiber strip and acting as a guide to hold said paper strip downwardly between the convolutions 37 and 38. The convolution 38 acts to force the paper tube forward on the mandrel 31 as it is wound thereon, so that said paper tube as it is wound on the mandrel is also fed longitudinally thereof along said mandrel, and during this feeding operation the adhesive tape 25 is wound on the exterior of the paper fiber tube, as seen in Fig. 1, the paper fiber being wound in a right hand helix upon the mandrel and the adhesive tape being wound in a left hand helix upon the outside of the paper fiber tube forming the lining of the conduit.

The general operation of the mechanism hereinbefore described whereby the flexible tubing is manufactured is as follows: Assuming the parts to be in the relative positions illustrated in Fig. 1, a rotary motion is imparted to the shaft 10 by the driving pulley 11. This rotates the gear 30, the intermediate gear 29 and the gear 28, thus imparting to the head 27 which carries the adhesive tape bobbin a rotation in the direction of the arrow $d$. The gear 23 rotates the intermediate gear 22 which rotates the intermediate gear 21, thus imparting to the gear 20 a rotation in the direction of the arrow $b$ and hence imparting to the head 14 and the bobbin carrying the paper fiber 17 a rotation in the direction of the arrow $c$. Thus the direction of rotation of the paper fiber bobbin is opposite to that of the adhesive tape bobbin. The paper fiber passes from the bobbin 16 beneath the finger 42 and between the convolutions 37 and 38 of the helical flange on the sleeve 39 and is wound upon the periphery of the mandrel 31. It will be seen that the sleeve 39 with the flanges 37 and 38 thereon constitutes a guide for said paper strip, said guide being concentric with the mandrel 31. The adhesive tape is wound upon the periphery of the paper fiber tube thus formed, as hereinbefore described, and during the winding of the paper fiber and of the tape to form the flexible tube for electrical conduits, the mandrel is also rotated in the same direction as the head 27 and in the opposite direction to the rotation of the head 14. The object of rotating the mandrel is to counteract the tendency of the tubing to twist, and consequently to bind on the mandrel as it is formed. It is to be noted that the mandrel is rotated in a direction opposite to that in which the paper fiber is wound. As the tube is thus manufactured, it is fed along the mandrel 31 by the helical convolution flange 38 which pushes the paper tube along the mandrel as it is being formed and thus also feeds with its the covering of adhesive tape.

The mechanism for inserting the flexible elements, such as loops of thread, in the flexible tube hereinbefore described is illustrated at the left of Fig. 1 in plan view and is also illustrated in Figs. 2, 4, 5, 6, 7, 8 and 9. This mechanism consists of a curved eye-pointed needle 43 which is clamped to a rocker arm 44 by a clamp-plate 45 and screw 46. In alinement with the needle is an awl 47 which is clamped to the rocker arm 44 by a clamp block 48 and screw 49 (see Figs. 6 and 7). The free ends of the needle and awl extend toward each other and are concentric with each other. The needle 43 extends through a hole in a needle guard 50 which is mounted concentrically with said rocker-arm. The rocker-arm 44 is fastened to a shaft 51 which is journaled in a bearing 52 on the frame 53.

The needle guard 50 is rotatably mounted upon one end of the shaft 51 and is held thereon against lateral movement by a washer 54 and screw 55. The needle guard 50 has a projection 56 thereon which is adapted to be engaged by the clamp-plate 45 of the rocker-arm 44 and rock the needle guard 50 positively away from the flexible tube. Said needle guard is rocked in the opposite direction during the motion of the needle rocker arm toward the flexible tube by a yielding means interposed between the rocker-arm and needle guard and consisting of a spring 57 one end of which is fastened to a pin 58 which, in its turn, is fastened to the rocker-arm 44, the other end of said spring being fastened to a pin 59 which is fastened to the needle guard 50.

An intermittent rocking motion is imparted to the rocker-arm 44, and hence to the needle 43 and awl 47, by the shaft 51, said shaft being rocked by a pinion 60 fast thereto (Fig. 4) and meshing into a rack 61 arranged to slide in ways 62 on the frame 53. A reciprocatory motion is imparted to the rack 61 by a cam-slide 63, one end of which is pivoted at 64 to the rack-slide 61, the other end of which is provided with a slot 65 through which the shaft 66 projects, said shaft thus providing a bearing for the slotted end of the cam-slide 63 to slide upon. A cam roll 67 is journaled upon the cam-slide 63 and projects into a cam groove 68 provided in the cam 69.

As the awl and needle are rocked by the rocker-arm 44 to alternately penetrate the flexible tube and insert a loop of thread therein, respectively, said awl and needle extend through the walls of the flexible tube and into an annular groove 70 formed in the periphery of the mandrel 31, and as the tube is fed along the mandrel, as hereinbefore described, the threads or flexible elements which project through into the interior of the flexible tube are smoothed down by passing along out of said groove and along the periphery of said mandrel.

A looper 71 is provided (see Figs. 6 and 7) and said looper takes the loop from the needle and holds it while the needle is retreating through the material in a manner well known to those skilled in the art. A rotary motion is imparted to this looper (Figs. 1, 6 and 7) by a shaft 72 to which it is fastened, said shaft being journaled to rotate in bearings 73, 73′, and a rotary motion is imparted to said shaft by a bevel gear 74 (Fig. 2) which meshes into a bevel gear 75 fast to a shaft 76 rotatably mounted in a bearing 77 and having fastened thereto at its opposite end a bevel gear 78 which meshes into a bevel gear 79 fast to the shaft 66.

During the insertion of the awl and needle in the tube, the flexible tube is clamped and held stationary by means of a clamp 82 formed in two parts 80 and 81 which extend partly around the tube 83 and are of sufficient width to clamp the tube 83 upon opposite sides of the needle and awl during the sewing operation. The clamp fingers 80 and 81 are moved toward and away from each other intermittently by mechanism illustrated in Figs. 4 and 5. The fingers 80 and 81 are fastened to slides 84 and 85, respectively. The slide 84 has a rack 86 thereon and the slide 85 has a rack 87 thereon and these racks mesh, respectively, into gears 88 and 89.

The gears 88 and 89 are fastened to shafts 90 and 91, respectively, and the shafts 90 and 91 have fastened thereto gears 92 and 93, respectively, which gears mesh into each other. A rocking motion is imparted to the gear 93 and hence to the gear 92 by a cam slide 94 (Fig. 4) which at one end thereof is pivotally connected at 95 to the gear 93; the other end thereof is slotted and slidably mounted upon the shaft 66. A cam roll 96 is rotatably mounted upon the cam slide 94 and projects into a cam groove provided in the cam 97 which cam is rigidly fastened to or integral with the cam 69. Thus, a reciprocatory motion being imparted to the cam slide 94 by the cam 97, a rocking motion is imparted to the gears 93 and 92 and also to the gears 88 and 89, and by the gears 88 and 89 a reciprocatory motion is imparted to the slides 84 and 85 and to the clamp fingers 80 and 81, respectively, thus alternately clamping the tube 83 during the sewing operation and releasing the same in order that the tube may be fed by the tube forming mechanism along the mandrel 31.

The thread joining the different loops which are inserted in the tube 83 may be left intact without cutting the same between said loops if so desired, in which case longitudinal extension of the paper tube will be prevented, and especially is this the case when said fiber tube is surrounded by a woven covering impregnated with a waterproofing and insulating material, but in some cases it is preferred to cut the thread 98 between the loops 99, and for this purpose I provide a thread cutting and holding mechanism, as illustrated in Figs. 6, 7, 8 and 9, in which 100 is a stationary cutter mounted upon a stud 101 fast to the frame 53. The movable cutter 102 is mounted to rock upon the stud 101 and a rocking motion is imparted thereto by a cam slide 103 which is pivotally connected at 104 to the movable cutter 102 and is slotted at its opposite end to embrace a shaft 105, (Fig. 4).

A reciprocatory motion is imparted to the cam slide 103 by a cam 106 adapted to engage at certain times a cam roll 107 on said cam slide 103. A spring 108 moves the cam slide in the opposite direction to that in which it is moved by the cam 106. On one side of the stationary cutter 100 is fastened a clamp-plate 109 between which and the movable cutter 102 the thread is clamped, after having been cut, for a certain time during the sewing operation, as illustrated in detail in Fig. 9. The shaft 66 is rotated by a clutch-pulley 110, a rotary motion being imparted to said clutch pulley by a belt 111 connecting said pulley to a pulley 112 fast to a shaft 113. The shaft 113 has a pulley 114 fast thereto which is rotated by a belt 115, said belt being driven by a pulley 116 on the main driving shaft 10, (Fig. 1).

The shaft 105 has a rotary motion imparted thereto by a bevel gear 117 which meshes into a bevel gear 118 fast to a shaft 119 (Fig. 2) said shaft 119 being rotatably mounted in a bearing 120 on the frame 53 and having fastened to its lower end a worm gear 121 which meshes into a worm 122 fast to the shaft 113. The pulley 110 is locked to the shaft 66 to rotate said shaft and to operate the sewing, thread cutting and tube clamping mechanisms by a clutch of any suitable type, but which preferably consists of a hardened steel cam A keyed to the shaft 66; a clutch ring B mounted to turn slightly on said shaft, a series of rollers C held loosely in slots in said ring and a spring D acting on the clutch ring and causing the same to turn, carrying with it said rollers toward the high point of said clutch cam. The driving pulley 110 is recessed to receive said clutch mechanism, the lining of said recess being hardened, the diameter of which is such that when said rollers reach a point about half way between the lowest and highest point of said cam they come in contact with said hardened surface and act as wedges to lock said clutch. The clutch operating mechanism consists of a lever 123, Fig. 4, pivoted at 124 to a bracket 125 fast to the frame 53, said lever being held in the position illustrated in Fig. 4 against a stop 126 by a spring 127. The upper end of said lever 123 engages a lug E fastened to said clutch ring and throws said clutch out of action. When, however, it is desired to connect the clutch pulley to the shaft in a manner well known to those skilled in this art, said clutch mechanism is operated to so connect the clutch pulley to the shaft by an arm 128 fast to the shaft 105 which, as it rotates in the direction of the arrow e, tips the lever 123 upon its pivot 124, releases the clutch and causes the clutch pulley to be connected to the shaft 66 to rotate the same and thus to operate the different sewing, thread cutting and tube clamping mechanisms.

It is evident that without departing from the spirit of my invention the cutting mechanism may be omitted and in that case the thread 98 would be continuous from loop to loop.

Figure 10:
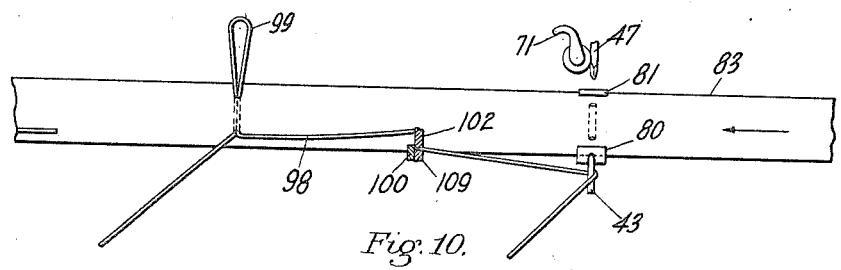

Having thus specifically and to some extent in general described the operation of my machine for manufacturing flexible tubing, I will now proceed to describe the general operation of the same. Reference may be had to several steps in the operation of sewing, feeding, cutting the thread and clamping the same, also to the clamping of the tube, shown in the diagrammatic views Figs. 10, 11, 12 and 13. The tube is formed by the mechanism at the right of Fig. 1 in a manner hereinbefore fully described and is fed along the mandrel 31, as hereinbefore fully described. As the shaft 105 rotates, the arm 128 (Fig. 4) engages the under side of the arm 123, tipping said arm 123 on the pivot 124. The clutch is thrown into operation and the shaft 66 is rotated thereby. The rotation of the shaft 66 first causes the clamp fingers 80 and 81 to be moved toward each other until they clamp the tube 83 by the mechanism hereinbefore described (see Fig. 4) consisting of the gears 88 and 89, 92 and 93, cam slide 94 and cam 97. At this time the parts will be in the relative positions illustrated in Fig. 10, the loop 99 having been previously inserted in the tube 83 and the thread 98 having been cut by the cutters 100 and 102 and clamped by the cutter 100 against the plate 109. The next operation is to punch a hole through the tube for the loop of thread to be inserted therein by the needle. This operation is illustrated in Fig. 10 which shows the awl hole punched in tube 83 and the clamp fingers 81 and 80 clamping said tube, so that it can not feed forward in the direction of the arrow thereon. While this tube is being clamped during the punching of the tube by the awl and the insertion of the loop of thread by the needle, the feed continues from the tubing machine, but the convolutions of the tube being slightly separated, it is possible to do this without crumpling the tube simply by compressing the tube longitudinally thereof and causing the spaces between the different convolutions of the tube between the clamp and the tubing machine to close up slightly. The rocker-arm 44 is rocked alternately in opposite directions so that the awl 47 passes through the tube 83 and punches a hole in the same; then the motion of the rocker arm is reversed and the needle 43 with the loop of thread thereon passes through the hole made by the awl to the position illustrated in Fig. 11. This rocking of the rocker-arm 44 is performed by the shaft 51 which is rocked by the gear 60, rack slide 61, cam slide 63 and cam 69 (Fig. 4).

During the forward motion of the awl 47 the needle 43 moves away from the tube and the clamp block 45 engages the projection 56 on the needle guard 50 and, overcoming the tension of the spring 57, causes said needle guard or guide arm to rock backwardly away from the tube. Upon reversing the movement of the rocker-arm, the awl passes out of the tube, the needle passes into the tube and through to the opposite side, the guide arm 50 engages the tube and after such movement, further forward movement of the rocker arm 44 causes the spring 57 to yield without causing injury to the tube by the guide arm 50, and at this time said arm remains stationary while the needle is passing forwardly through the tube and also remains stationary until, upon its return movement through the tube, the clamp block 45 engages the projection 56 and moves the guide arm to the position illustrated in Fig. 6.

Figure 11:
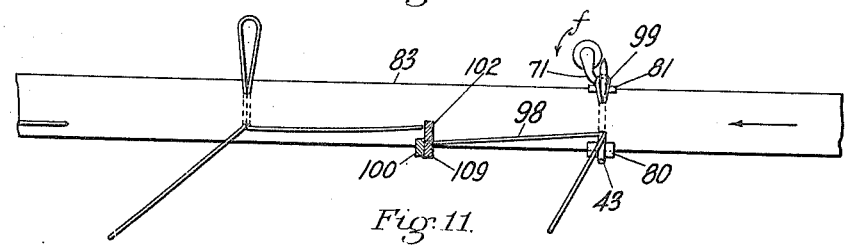
Figure 12:
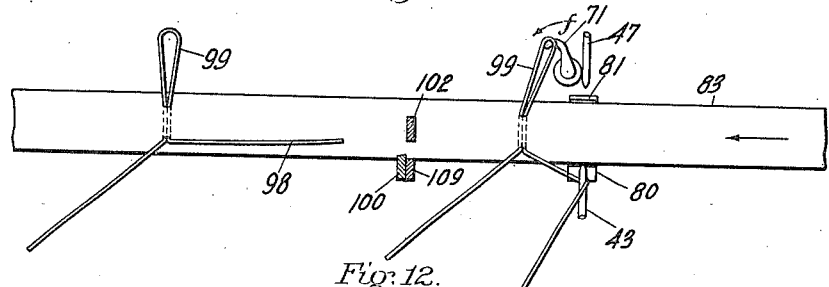
Figure 13:
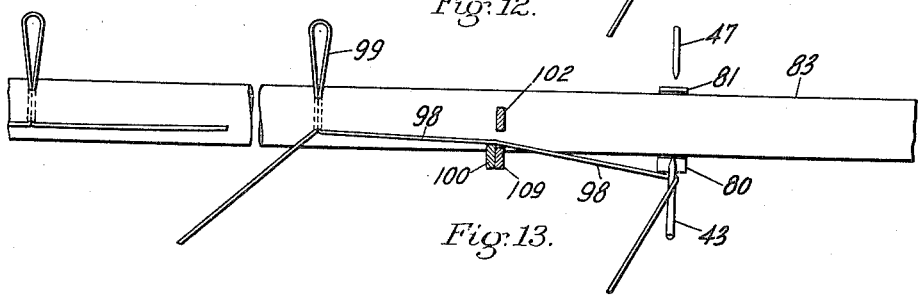

During the movement of the needle through the tube, just described, the free end of the thread 98 is held between the cutter 102 and the clamp plate 109, as will be seen in Fig. 11 and also Fig. 9. When the needle has passed forwardly through the hole made by the awl in the tube 83 a loop of thread 99 will be taken by the looper 71, which rotates in the direction of the arrow f (Fig. 11) and takes the loop from the needle. The needle then retreats through the stock, as seen in Fig. 12, the clamp fingers 81 and 80 separate and free the tube so that it can feed forward in the direction of the arrow thereon and the cutter 102 moves away from the cutter 100 and the clamp-plate 109, thus freeing the thread 98 and the parts are then in the position illustrated in Fig. 12. The looper 71 having continued its rotation in the direction of the arrow f arrives substantially at the position illustrated in Fig. 12, and further forward movement of the tube pulls the loop 99 off of the looper 71 and the thread which runs from this latest loop 99 to the needle is drawn through the needle from the bobbin until the parts assume the position illustrated in Fig. 13, wherein the thread 98, it will be seen, passes from the latest loop 99 formed between the cutters 100 and 102, which are at that time open or apart, to the needle and thence to any suitable thread holder, such as a bobbin or spool holder. (Not shown in the drawings.)

During the operation hereinbefore described, the looper 71 is rotated by the shaft 72, gears 74 and 75, shaft 76, gears 78 and 79 and shaft 66 (Fig. 2.) The cutters during such operation are operated to cut and clamp the thread by the cam slide 103, shaft 105, cam 106 and spring 108. (Figs. 4 and 8.) After the clamping of the tube, the insertion of the loops of thread and the cutting of the thread has been completed, as hereinbefore described, and the tube has been released by the clamping mechanism, the clutch lever 123 is released by the arm 128, the end of which passes beyond the free end of the clutch lever 123 and releases the same, so that the spring 127 can tip said clutch lever back to the position illustrated in Fig. 4, when it will operate in a manner well known to those skilled in this art to disconnect the clutch pulley 110 from the shaft 66. Then the operation of the forming of the tube by the machine will continue and the tube will be fed along the mandrel a certain distance, whereupon the machine is so timed that the clutch will again be thrown into operation and the clamping and sewing operations will be repeated. To counteract any tendency which the tube 83 may have to twist upon the mandrel 31, a pair of guide rolls 129 (Fig. 3) is provided, one of said guide rolls being shown in Fig. 1 and the pair of guide rolls being shown in dotted lines (Fig. 3).

Having thus described my invention, what I claim and desire by Letters Patent to secure is:

1. A machine for manufacturing flexible tubing, having, in combination a mandrel, mechanism for winding a strip of sheet material on said mandrel in the form of a helical tube, means for feeding said tube along said mandrel, mechanism adapted to intermittently clamp said helical tube to prevent the feeding thereof, sewing mechanism embodying in its construction a needle adapted to insert in said tube a series of spaced apart loops of thread, and means for automatically interrupting the action of the sewing mechanism at regular intervals.

2. A machine for manufacturing flexible tubing having, in combination, a mandrel provided with an annular groove in its periphery, mechanism adapted to impart a rotary motion to said mandrel, mechanism adapted to wind a strip of sheet material on said mandrel in the form of a helical tube, means adapted to feed said helical tube along said mandrel, mechanism adapted to intermittently clamp said tube, and a sewing mechanism embodying in its construction a needle adapted to extend through said tube and into said groove, and mechanism adapted to impart a reciprocatory motion to said needle whereby a series of loops of thread may be inserted in said tube.

3. A machine for manufacturing flexible tubing, having in combination a mandrel, mechanism adapted to wind a strip of sheet material on said mandrel in the form of a helical tube, and a sewing mechanism embodying in its construction a needle adapted to extend through said tube and into a groove in the periphery of said mandrel, and mechanism adapted to impart an intermittent reciprocatory motion to said needle, whereby a series of loops of thread may be inserted in said tube.

4. A machine for manufacturing flexible tubing, having in combination a mandrel, mechanism adapted to wind a strip of sheet material on said mandrel in the form of a helical tube, the said mandrel being adapted to permit a series of loops of thread to be inserted in said tube before it leaves the mandrel, and a sewing mechanism embodying in its construction a needle adapted to extend through said tube, and mechanism adapted to impart an intermittent reciprocatory motion to said needle, whereby a series of loops of thread may be inserted in said tube.

5. A machine for manufacturing flexible tubing having, in combination, a mandrel provided with an annular groove in its periphery, mechanism adapted to impart a rotary motion to said mandrel, a bobbin carrying head, mechanism adapted to rotate said bobbin carrying head around said mandrel in the opposite direction to that in which said mandrel is rotated, a bobbin eccentrically mounted on said head adapted to hold a strip of sheet material, a guide rotatable with said head concentric with said mandrel and having a helical flange thereon whereby said strip of sheet material may be wound on said mandrel in the form of a helical tube and fed along said mandrel, a sewing mechanism embodying in its construction a needle adapted to extend through said tube and into said groove and mechanism adapted to impart a reciprocatory motion to said needle, whereby a series of loops of thread may be inserted in said tube.

6. A machine for manufacturing flexible tubing having, in combination, a mandrel provided with an annular groove in its periphery, mechanism adapted to impart a rotary motion to said mandrel, a bobbin carrying head, mechanism adapted to rotate said bobbin carrying head around said mandrel in the opposite direction to that of the rotation of said mandrel, a bobbin eccentrically mounted on said head adapted to hold a strip of sheet material, a guide rotatable with said head concentric with said mandrel and having a helical flange thereon, whereby said strip of sheet material may be wound on said mandrel in the form of a helical tube and fed along said mandrel, mechanism adapted to intermittently clamp said helical tube against longitudinal movement on said mandrel, a sewing mechanism embodying in its construction a needle adapted to extend through said tube and into said groove, and mechanism adapted to impart a reciprocatory motion to said needle, whereby a series of loops of thread may be inserted in said tube.

7. A machine for manufacturing flexible tubing having, in combination, a mandrel provided with an annular groove in its periphery, mechanism adapted to wind a strip of sheet material on said mandrel in the form of a helical tube, means adapted to feed said helical tube along said mandrel, mechanism adapted to wind another strip of sheet material on said helical tube in the opposite direction to that in which said first-named strip is wound, mechanism adapted to rotate said mandrel in the opposite direction to that in which said first strip of sheet material is wound thereon and a sewing mechanism embodying in its construction a needle adapted to extend through said helical tube and into said groove, mechanism adapted to impart a reciprocatory motion to said needle, whereby a series of loops of thread may be inserted in said tube and mechanism adapted to clamp said tube while said needle is extending into said tube.

8. A machine for manufacturing flexible tubing having, in combination, a mandrel, mechanism adapted to wind a strip of sheet material on said mandrel in the form of a helical tube, means adapted to feed said helical tube along said mandrel, a sewing mechanism embodying in its construction a needle adapted to insert in said helical tube a series of loops of thread and mechanism adapted to cut said thread after each loop is formed, said cutting mechanism being provided with means for holding the thread during the formation of the next loop.

9. A machine for manufacturing flexible tubing having, in combination, a mandrel, mechanism adapted to wind a strip of sheet material on said mandrel in the form of a helical tube, means adapted to feed said helical tube along said mandrel, a sewing mechanism embodying in its construction a needle adapted to insert in said helical tube a series of loops of thread and mechanism adapted to cut said thread between one of said loops and said needle, said mechanism adapted to hold the cut end of said thread during the sewing operation.

10. In a machine for manufacturing flexible tubing, the combination of a mandrel, means for feeding a tube of flexible material along said mandrel, sewing mechanism embodying in its construction a needle adapted to coöperate with the mandrel to insert in said tube a series of spaced apart loops of thread, means for automatically interrupting the movement of said needle at regular intervals, and means for intermittently clamping the tube to prevent feeding thereof during the sewing operation.

11. In a machine for manufacturing flexible tubing, the combination of a mandrel, means for feeding a tube of flexible material along said mandrel, sewing mechanism embodying in its construction a needle adapted to coöperate with the mandrel to insert in said tube a series of spaced apart loops of thread, said mandrel being provided with an annular groove to receive said needle, means for oscillating said needle, means for interrupting the oscillation of said needle at regular intervals, and means for intermittently clamping the tube to prevent feeding thereof during the sewing operation.

12. In a machine for manufacturing flexible tubing, the combination of a mandrel, means for rotating said mandrel, means for feeding a tube of flexible material along said mandrel, sewing mechanism embodying in its construction a needle adapted to coöperate with the mandrel to insert in said tube a series of spaced apart loops of thread, said mandrel being provided with a groove to receive said needle, means for automatically interrupting the movement of said needle at regular intervals, and means for intermittently clamping the tube to prevent movement thereof during the sewing operation.

13. In combination, a mandrel, means adapted to feed a tube of flexible material along said mandrel, a sewing mechanism embodying in its construction an intermittently operated needle adapted to coöperate with said mandrel to insert in said tube a series of loops of thread and mechanism adapted to cut said thread after each loop is formed, said cutting mechanism being provided with means for holding the thread during the formation of the next loop.

14. A machine for manufacturing flexible tubing having, in combination, a mandrel, mechanism adapted to wind a strip of sheet material on said mandrel in the form of a helical tube, means adapted to feed said helical tube along said mandrel, means adapted to intermittently clamp said helical tube against longitudinal movement on said mandrel, a sewing mechanism embodying in its construction a needle adapted to insert in said tube a series of spaced apart loops of thread, means for automatically interrupting the action of said sewing mechanism at regular intervals, and means adapted to clamp said thread between one of said loops and said needle.

15. A machine for manufacturing flexible tubing having, in combination, a mandrel provided with a groove in its periphery, mechanism adapted to wind a strip of sheet material on said mandrel in the form of a helical tube, means adapted to feed said helical tube along said mandrel and a sewing mechanism embodying in its construction an intermittently operated needle adapted to extend through said tube and into said groove, mechanism adapted to impart a reciprocatory motion to said needle whereby a series of loops of thread may be inserted in said tube and means to clamp said thread between one of said loops and said needle during the sewing operation.

16. A machine for manufacturing flexible tubing having, in combination, a mandrel provided with an annular groove in its periphery, mechanism adapted to impart a rotary motion to said mandrel, mechanism adapted to wind a strip of sheet material on said mandrel in the form of a helical tube, means adapted to feed said helical tube along said mandrel, means adapted to intermittently clamp said tube while on said mandrel, a sewing mechanism embodying in its construction a needle adapted to extend through said tube and into said groove, mechanism adapted to impart a reciprocatory motion to said needle whereby a series of loops of thread may be inserted in said tube, and means to clamp said thread between one of said loops and said needle during the sewing operation.

17. A machine for manufacturing flexible tubing having, in combination, a mandrel, mechanism adapted to wind a strip of sheet material on said mandrel in the form of a helical tube, means adapted to feed said helical tube along said mandrel and a sewing mechanism embodying in its construction a rocker-arm, a needle and an awl fast to said rocker-arm in alinement with each other, their free ends extending toward each other, and mechanism adapted to impart a rocking motion to said rocker-arm whereby a series of loops of thread may be inserted in said tube.

18. A machine for manufacturing flexible tubing having, in combination, a mandrel, mechanism adapted to wind a strip of sheet material on said mandrel in the form of a helical tube, means adapted to feed said helical tube along said mandrel, means adapted to intermittently clamp said tube while on said mandrel, a sewing mechanism embodying in its construction a rocker-arm, a needle and an awl fast to said rocker-arm in alinement with each other, their free ends extending toward each other and mechanism adapted to impart a rocking motion to said rocker-arm whereby a series of loops of thread may be inserted in said tube.

19. A machine for manufacturing flexible tubing having, in combination, a mandrel, mechanism adapted to wind a strip of sheet material on said mandrel in the form of a helical tube, means adapted to feed said helical tube along said mandrel, means adapted to intermittently clamp said tube while on said mandrel, a sewing mechanism embodying in its construction a rocker-arm, a needle and an awl fast to said rocker-arm in alinement with each other, their free ends extending toward each other, mechanism adapted to impart a rocking motion to said rocker-arm whereby a series of loops of thread may be inserted in said tube and means to cut said thread between one of said loops and said needle.

20. A machine for manufacturing flexible tubing having, in combination, a mandrel, mechanism adapted to wind a strip of sheet material on said mandrel in the form of a helical tube, means adapted to feed said helical tube along said mandrel, means adapted to intermittently clamp said tube while on said mandrel and a sewing mechanism embodying in its construction a rocker-arm, a needle and an awl fast to said rocker-arm in alinement with each other, their free ends extending toward each other, mechanism adapted to impart a rocking motion to said rocker-arm whereby a series of loops of thread may be inserted in said tube and means to clamp the thread between one of said loops and said needle.

In testimony whereof I have hereunto set my hand in presence of two subscribing witnesses, this first day of August, 1911.

CARL OSCAR BERG.

Witnesses:
ELMER L. BRIGGS,
A. G. SULLIVAN.